June 6, 1933.    F. W. ROBERTSHAW ET AL    1,912,727
CONTROLLING VALVES AND SYSTEM EMBODYING THE SAME
Original Filed March 24, 1926    4 Sheets-Sheet 1

INVENTORS
Frederick W. Robertshaw
George A. Robertshaw
by Byrne, Stebbins & Parmelee
their attorneys June 6, 1933.  F. W. ROBERTSHAW ET AL  1,912,727
CONTROLLING VALVES AND SYSTEM EMBODYING THE SAME
Original Filed March 24, 1926  4 Sheets-Sheet 2
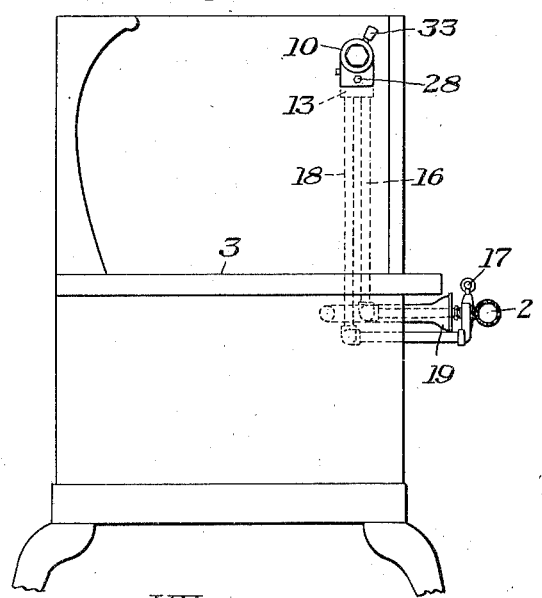
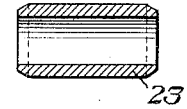
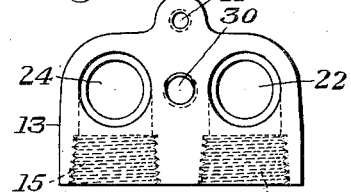
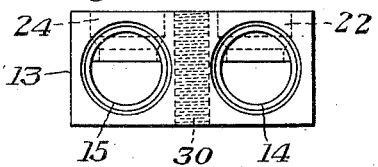
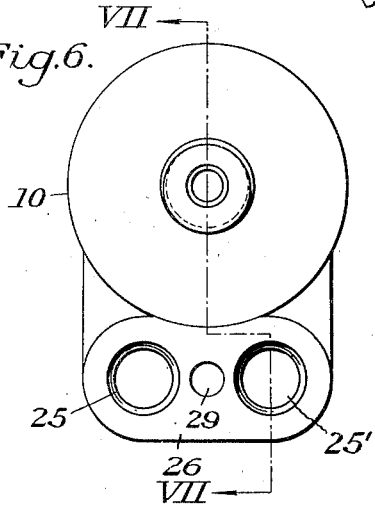
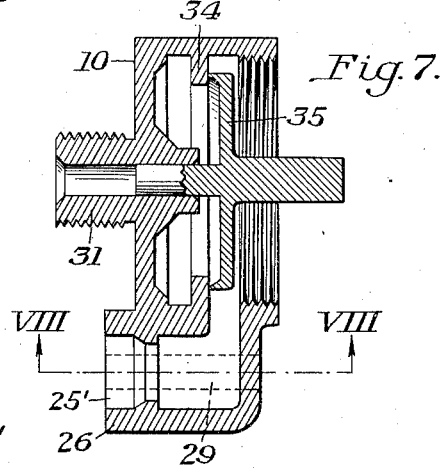
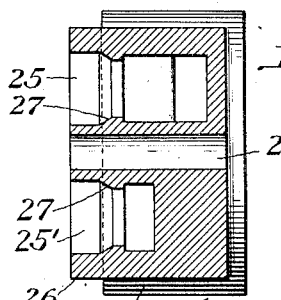
INVENTORS
Frederick W. Robertshaw
George A. Robertshaw
by Byrnes, Stebbins & Parmelee
their attorneys

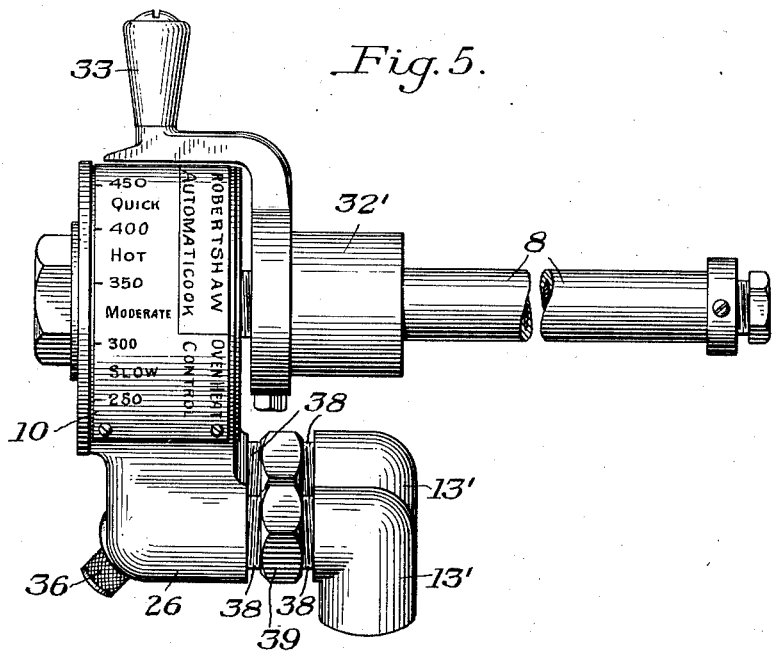
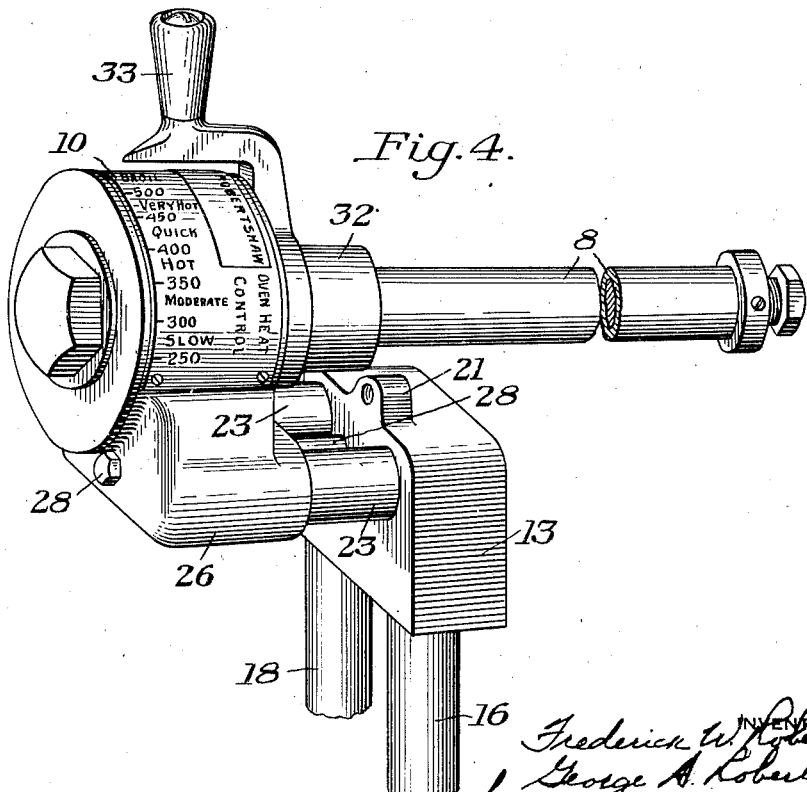

Fig.12.
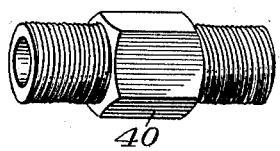
Fig.4ª
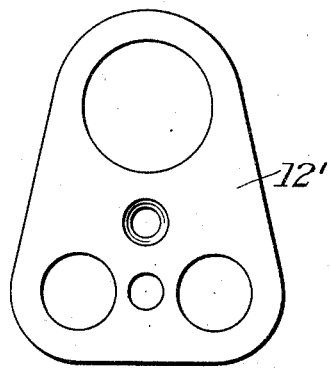
Fig.13.
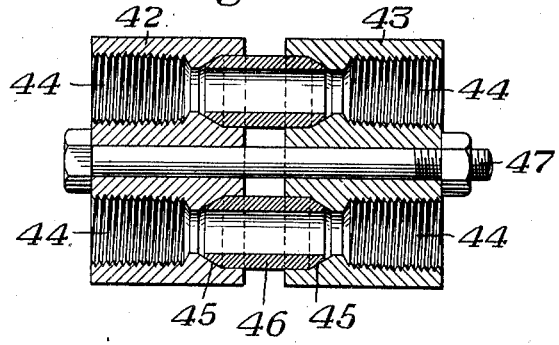

Patented June 6, 1933

1,912,727

UNITED STATES PATENT OFFICE

FREDERICK W. ROBERTSHAW, OF PITTSBURGH, AND GEORGE A. ROBERTSHAW, OF GREENSBURG, PENNSYLVANIA, ASSIGNORS TO ROBERTSHAW THERMOSTAT COMPANY, OF YOUNGWOOD, PENNSYLVANIA, A CORPORATION OF PENNSYLVANIA

CONTROLLING VALVES AND SYSTEM EMBODYING THE SAME

Original application filed March 24, 1926, Serial No. 96,977. Divided and this application filed November 30, 1928. Serial No. 322,926.

The present invention relates broadly to the art of burner systems and control valves therefor, and more particularly to an improved thermostatic control valve and oven system in which the same is embodied.

At the present time it is customary in the general art to which the present invention relates to utilize thermostatic control valves on domestic ovens. In some cases the entire structure is positioned within the oven so that it is necessary to open the door to control the same, while in other cases the thermostatic element is projected into the oven through one of the walls thereof with the valve casing and the piping exteriorly positioned with respect to the oven.

While both of the above types of installations possess features of merit, it has been found to be highly desirable to provide a form of control which may be applied to any oven after all of the piping is in position, and in which all of the parts, with the exception of the control casing, are concealed by the oven. In accordance with the present invention such an improved type of control and installation is made possible.

Other objects of the present invention are to provide a more attractive oven structure by reason of the concealed gas pipes, and to provide an installation in which the thermostatic valve may be quickly applied, removed or replaced as may be desired.

Still another object of the present invention is to provide a control installation of such character that linings within the oven can be easily replaced without the necessity of a special lining structure as required in casings where difficulty is encountered in the removal of the thermostat.

In the accompanying drawings there are shown for purposes of illustration only, certain preferred embodiments of the present invention, it being understood that the drawings do not define the limits of our invention, as changes in the construction and operation disclosed therein may be made without departing either from the spirit of the invention or the scope of our broader claims.

In the drawings:—

Figure 3 is an end view of the range shown in Figures 1 and 2;

Figure 4 is a perspective view, partly broken away, of the improved control shown in Figures 1 and 3;

Figure 1:
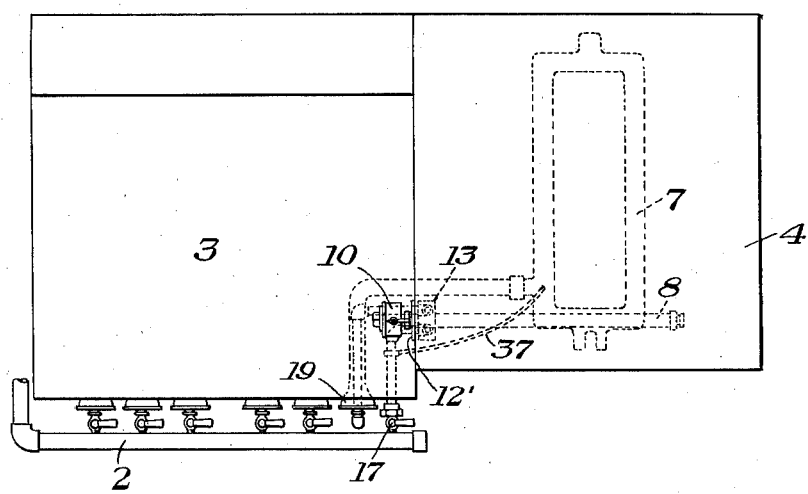
Figure 1 is a top plan view, largely diagrammatic, of a range embodying the improved control.

Figure 4ª is a plan view showing a form of cover plate adaptable for use with the construction of Figure 4;

Figure 5 is a view similar to Figure 4 showing a slightly modified form of control with union connections;

Figure 6 is a rear elevation of the valve casing;

Figure 7 is a vertical sectional view on the line VII—VII of Figure 6 looking in the direction of the arrows;

Figure 8 is a transverse sectional view on the line VIII—VIII of Figure 7 looking in the direction of the arrows;

Figure 9 is a front elevation of a special double L fitting;

Figure 10 is a bottom end view of the fitting of Figure 9;

Figure 11 is a longitudinal sectional view through a form of nipple suitable for use with the control structure of Figures 4 and 6 to 10, both inclusive;

Figure 12 is a perspective view illustrating a modified form of connection; and

Figure 13 is a detail sectional view illustrating in detail the advantages of the use of a compression nipple as shown, for example, in Figure 11.

In carrying out the present invention, which is adaptable to ranges and ovens of any desired construction, there may be taken any suitable range comprising the usual burner manifold 2 for supplying the hot top portion 3 of the range, and having an oven structure 4 at one end. The oven may comprise the usual upper portion having a door 5 to the oven proper and lower portion having a door 6 to the broiling compartment. Within the broiling compartment may be located any desired form of burner 7, as is customary in the art, the present invention having to do particularly with an improved arrangement for supplying gas to such burner.

During the construction of the range by the manufacturer, there may be suitably positioned therein the burner 7 in the broiling compartment, and also a thermostat element 8 in the oven compartment. This thermostatic element, together with the valve casing used in connection therewith and to be later described, may be of any desired construction, but are conveniently of the general structure disclosed in our Patent No. 1,455,663 of May 15, 1923. The heat responsive portion of the thermostat may be suitably secured in the oven in any desired position as by a supporting bracket 9, one end of the element being so mounted as to project outwardly through one wall of the oven in position to cooperate with the valve casing 10.

Positioned within the oven between the inner wall 11 thereof and the outer wall 12 through which the thermostat projects, is a fitting 13, herein illustrated as comprising a casting, shown more in detail in Figures 4, 9 and 10, and constituting in effect a double L. The fitting 13 has a threaded inlet connection 14 and a threaded outlet connection 15. Threaded into the inlet 14 is one end of a pipe 16 extending upwardly between the walls 11 and 12 of the oven so as to be concealed from view, the lower end of this pipe having suitable connection with the manifold 2, preferably through a shut off valve 17.

Figure 2:
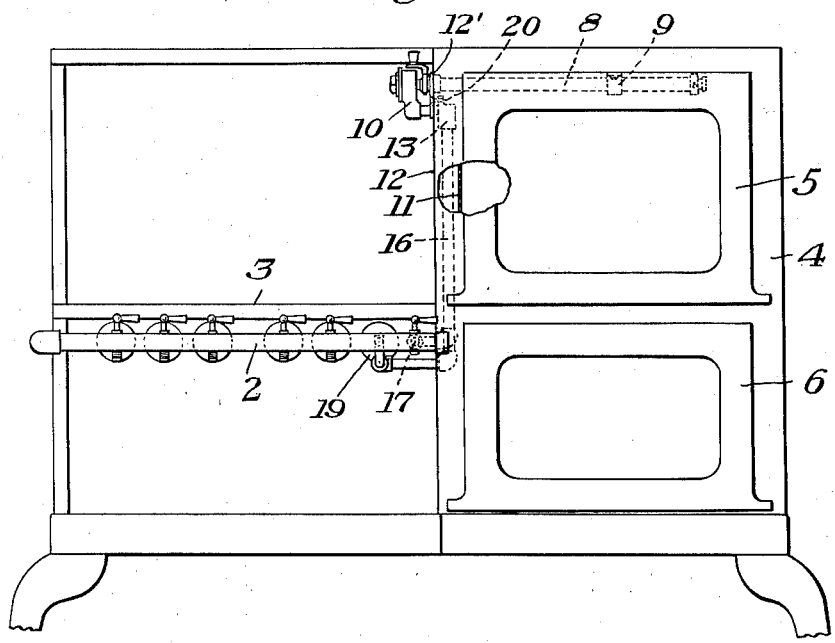
Figure 2 is a partial front elevation, largely diagrammatic, of the range shown in Figure 1, certain of the parts being broken away for the purpose of illustrating a portion of the interior construction.

The threaded outlet connection 15 has screwed thereinto a second pipe 18, preferably located similarly to the pipe 16 and having connection at its lower end to the Bunsen tube 19 which supplies the burner 7. After all of the desired connections are made, the fitting 13 may be rigidly held in place by providing a cover plate 12' and passing a suitable bolt 20 (Figure 2) through the cover plate and outer wall 12 of the oven and into the threaded lug 21 provided on the fitting 13. This forms a rigid mounting in which substantially all of the parts are concealed, and in which the concealed parts are in position to have the valve casing applied thereto. The cover plate is illustrated in detail in Figure 4ᵃ, and is adapted to be placed outside of the enameled side wall of the oven to give a finished appearance and also to permit the pipes 16 and 18 and the double L casting to be secured in place before application of the thermostat.

By reference more particularly to Figures 9 and 10 of the drawings, it will be noted that the threaded inlet 14 communicates with an opening 22 having a tapered inner end adapted to cooperate with the correspondingly shaped end of a nipple 23, as shown in Figure 11. This nipple may be of suitable material adapted under compression to form a tight joint with the fitting. The threaded connection 15 communicates with a similar opening 24 adapted to cooperate with a nipple of the same character. After the range has been completely constructed as before described, and either before or after it leaves the manufacturer, nipples 23 may be placed in each of the openings 22 and 24, and these nipples at their outer ends slipped into similar openings 25 and 25' respectively in an extension 26 carried by the casing 10, the openings 25 and 25' having their axes substantially parallel to the longitudinal axis of the casing and substantially normal to the faces of the casing. These openings have inclined seats 27 adapted to cooperate with the tapered ends of the nipples 23 whereby when the casing 10 and the fitting 13 are drawn toward each other, tight joints for the flow of gas will be established. This drawing together of the parts may be accomplished by a drawbolt 28 passing through an opening 29 in the extension 26 and engaging the threaded opening 30 in the fitting 13. It will be apparent that this construction permits the thermostatic casing to be quickly applied and removed without the necessity of removing any portion of the permanent piping system of the oven, and at the same time it enables the use of a piping system which is, to a large extent, concealed within the oven walls.

The valve casing 10 has a threaded projection 31 on the rear face thereof adapted to cooperate with the revolving couple or adapter 32 carrying a control handle 33 as shown, for example, in our patent referred to. Within the casing is a suitable seat 34 for a valve 35, the casing being provided with any desired type of bypass, not shown, and bypass controlling means 36.

Any usual form of pilot may be provided, the pilot preferably being supplied with fuel through a connection 37 (Figure 1) with the outlet of the valve 17.

With the foregoing construction, it will be apparent that the operation of the thermostat will be effective for controlling the supply of fuel from the manifold 2 to the burner 7, the pilot supply being of such nature to insure a constant flame for lighting the burner at such times as gas is again supplied by the thermostat after a period during which it has been cut off.

In some cases it may be desired to eliminate the special fitting 13 and utilize separate L's 13' as shown, for example, in Figure 5. Such L's may be used with any form of union embodying suitable nipples 38 and a connection 39. With such a construction, the tightening of the connections 39 will draw the extension 26 on the valve casing 10 toward the L's until the unions are tight.

In Figure 12 there is illustrated in perspective still another form of the invention adapted to be used either in lieu of the compression nipples or the unions. This may comprise a right and left nipple having an intermediate shoulder 40 of suitable angular configuration to permit tightening of the nipples. Where such nipples are used, the left hand threads will be adapted to cooperate with the valve body and the right hand threads with the standard fittings provided. By merely tightening the nipples, the valve body and the L's will be drawn together.

In Figure 13 of the drawings there is illustrated in detail, and more or less diagrammatically, a form of connection embodying the compression nipple of Figure 11, this figure illustrating the adaptability of the connection in question to different systems whether embodying a thermostat or not, and whether handling gases or liquids.

In this figure there is indicated a fitting 42 and a fitting 43 which it is desired to connect. Each of these fittings is illustrated as having a plurality of threaded openings 44 adapted to receive pipes or the like, each of the threaded openings communicating with a seat 45 tapered to cooperate with the correspondingly tapered end of a compression nipple 46. As before pointed out, these nipples may be of any desired material, such for example, as copper, whereby they are adapted to partially form their own seat and prevent leakage when sufficient pressure is applied thereto. This pressure may be applied in any desired manner, as for example, by a bolt 47 extending through the connections 42 and 43 whereby they may be readily drawn together.

In this manner a tight connection may be quickly established without the necessity of relative rotation between the parts. This enables one part of a system to be completely installed and another part of the system to be subsequently added thereto.

With all of the forms herein illustrated, there are combined the advantage of concealed pipes, adding to the beauty of the range, possibility of quick removal of the thermostat valve in case replacement thereof is necessary, and quick application of the thermostat at the point desired, the thermostat being the last part which it is necessary to apply. The construction also lends itself to ready removal of the thermostat to permit replacement of linings within the oven, thereby obviating the necessity of providing other means for the removal of the linings as has heretofore been required where the removal of the thermostat is accompanied by difficulties.

We are aware of the fact that it has heretofore been proposed to provide a construction having concealed pipes, but we are not aware of the use of concealed pipes with an exposed thermostatic valve casing, although pipes hidden in rear of the range have been used. This combination has been found extremely desirable, as the location of the valve casing insures quick reduction in gas temperature, both by heat conduction and radiation.

The gas passing through the pipes 16 and 18 is obviously heated, but it has been demonstrated that, irrespective of the temperature at which the oven is operating, the temperature within the valve head does not exceed 310° F. This is below the point at which organic sulphides in the gas break up into inorganic sulphides, within a safe margin, it having been shown that the gases can be safely handled in this manner at temperatures below 350° F.

The present application is a division of our application Serial No. 96,977, which has eventuated as patent No. 1,704,487 of March 5, 1929.

A further advantage of the present invention arises from the fact that the user of the range is enabled to use the cooking top burners for boiling and frying, even in the event it is necessary to remove the thermostatic valve or in the event of failure of this valve to operate. If desired, in such cases, the thermostat may be bodily removed and a return band fitting slipped into place either on the threaded or the compression nipples. In such case, the temperature within the oven would be manually controlled by the valve 17.

Still another advantage arises from the use of the special double L fitting inasmuch as such a fitting is very shallow, permitting its use with ovens having a relatively narrow flue space therein. Also due to the fact that this fitting can be rigidly secured in place, it will be apparent that connection in many cases would be more easily made therewith than is possible with the separate elbows as shown in Figure 5.

We claim:—

1. A connection, comprising a pair of fittings each having a tapered seat therein, one of said fittings having a threaded opening therein to receive a pipe end, a nipple adapted to cooperate at opposite ends with the seats of the respective fittings and form a sealed point irrespective of the presence or absence of a pipe end in said opening, and means common to both fittings for drawing the fittings together in a direction substantially parallel to the longitudinal axis of the nipple, the axis of said threaded opening being at substantially right angles to the longitudinal axis of said nipple, one of said fittings comprising a valve casing.

2. A connection, comprising a pair of fittings each having a tapered seat therein, one of said fittings having a threaded opening therein to receive a pipe end, a nipple adapted to cooperate at opposite ends with the seats of the respective fittings and form a sealed joint irrespective of the presence or absence of a pipe end in said opening, and means for drawing the fittings together in a direction substantially parallel to the longitudinal axis of the nipple, the axis of said threaded opening being at substantially right angles to the longitudinal axis of said nipple, each of said fittings being constructed to have a fluid flow therein in a direction substantially parallel to the axis of said nipple and in a direction substantially at right angles to the axis of said nipple, one of said fittings comprising a valve casing.

3. A connection, comprising a pair of fittings each having a tapered seat therein, one of said fittings having a threaded opening therein to receive a pipe end, a nipple adapted to cooperate at opposite ends with the seats of the respective fittings and form a sealed joint irrespective of the presence or absence of a pipe end in said opening, and means for drawing the fittings together in a direction substantially parallel to the longitudinal axis of the nipple, the axis of said threaded opening being at substantially right angles to the longitudinal axis of said nipple, one of said fittings comprising a valve casing.

4. In a fuel system, a valve casing having an inlet opening and an outlet opening, said openings having substantially parallel axes and communicating with a valve chamber, a plurality of fuel supply lines having substantially parallel axes, the axes of said lines and of said openings being at substantially right angles to each other, a plurality of connections adapted to cooperate at their opposite ends with said casing and said fuel supply lines respectively, and means for drawing said casing and fuel supply lines one toward the other in a direction at substantially right angles to the axes of the fuel supply lines to establish closed flow passages between said lines and said casing through said connections.

5. In a fuel system, a valve casing having an inlet opening and an outlet opening, said openings having substantially parallel axes and communicating with a valve chamber, a plurality of fuel supply lines having substantially parallel axes, the axes of said lines and of said openings being at substantially right angles to each other, connecting means adapted to cooperate at one end with said fuel supply lines and having openings at substantially right angles to the axes of said lines, sleeve members positioned in said last mentioned openings and adapted to cooperate with the inlet and outlet openings of the valve casing for effecting a seal therebetween, and means for drawing said casing and fuel supply lines one toward the other in a direction at substantially right angles to the axes of the fuel supply lines and in line with the axes of said sleeve members to establish closed flow passages between said lines and said casing through said sleeve members and connecting means.

6. In a fuel system, a valve casing having a valve therein with an inlet opening and an outlet opening in the casing communicating with the space on opposite sides of the valve, the axes of said openings being in substantially parallel relationship, a plurality of fuel supply lines having their axes at substantially right angles to the axes of said openings, said fuel supply lines having connecting means cooperating therewith with openings having axes in substantial alinement with the axes of said first mentioned openings, and means for drawing said casing and fuel supply lines together about said connecting means in a direction substantially parallel to the axes of said connecting means and at substantially right angles to the axes of said fuel supply lines, said fuel supply lines yielding in a direction transversely to their flow axes as required to permit all of said connecting means to seat tightly.

7. In a fuel system, a valve casing having inlet and outlet openings disposed therein with substantially parallel axes, a pair of substantially parallel fuel conduits adjacent said openings with their major axes at substantially right angles to the axes of said openings and having portions directed toward said openings with the axes of said portions constituting substantial continuations of the axes of said openings, and a screw clamp effective to simultaneously secure both of said fuel conduits and said casing together through the medium of said portions whereby fuel-tight connections are provided therebetween, said fuel conduits being constructed to yield in a direction transversely to their major axes during the tightening of the set screw clamps as required to insure such fuel-tight connections.

8. A connection, comprising a pair of fittings each having a seat therein, one of said fittings having a threaded opening therein to receive a pipe end, means adapted to cooperate with the seats of the respective fittings and form a sealed joint therebetween irrespective of the presence or absence of a pipe end in said opening, and means for drawing the fittings together in a direction substantially normal to the axis of said threaded opening, one of said fittings comprising a valve casing.

9. A connection, comprising a pair of fittings each having a plurality of seats therein, one of said fittings having a plurality of threaded openings therein each of which is adapted to receive a pipe end, means adapted to cooperate with the seats of the respective fittings and form sealed joints therebetween irrespective of the presence or absence of pipe ends in said threaded openings, and means for drawing the fittings together in a direction substantially normal to the axes of said threaded openings, one of said fittings comprising a valve casing.

10. In a fuel system, a valve casing having an inlet opening and an outlet opening, said openings having substantially parallel axes and communicating with a valve chamber, a valve in said chamber effective for controlling the fluid flow between said openings, a plurality of fuel supply lines having substantially parallel axes, the axes of said lines and of said openings being at substantially right angles to each other, a plurality of connections adapted to cooperate with said casing and said fuel supply lines respectively, and means for drawing said casing and fuel supply lines one toward the other in a direction at substantially right angles to the axes of the fuel supply lines to establish closed flow passages between said lines and said casing through said connections.

11. In a fuel system, a valve casing having an inlet opening and an outlet opening, said opening having substantially parallel axes and communicating with a valve chamber, a valve in said chamber effective for controlling the fluid flow between said openings, a plurality of fuel supply lines having substantially parallel axes, the axes of said lines and said openings being at substantially right angles to each other, connecting means adapted to cooperate at one end with said fuel supply lines and having openings at substantially right angles to the axes of said lines, means cooperating with said last-mentioned openings and the inlet and outlet openings of the valve casing for effecting a seal therebetween, and means for drawing said casing and fuel supply lines one toward the other in a direction at substantially right angles to the axes of the fuel supply lines to establish closed flow passages between said lines and said casing.

12. In a fuel system, a valve casing having a valve therein with an inlet and an outlet opening in the casing communicating with the space on opposite sides of the valve, the axes of said openings being in substantially parallel relationship, a plurality of fuel supply lines having their axes at substantially right angles to the axes of said openings, said fuel supply lines having connecting means cooperating therewith with openings having axes in substantial alinement with the axes of said first-mentioned openings, and means for drawing said casing and fuel supply lines together through said connecting means in a direction substantially parallel to the axes of said openings in said connecting means and at substantially right angles to the axes of said fuel supply lines, said fuel supply lines yielding in a direction transversely to their flow axes as required to permit all of said connecting means to seat tightly.

In testimony whereof we have hereunto set our hands.

FREDERICK W. ROBERTSHAW.
GEORGE A. ROBERTSHAW.

CERTIFICATE OF CORRECTION.

Patent No. 1,912,727.  June 6, 1933.

FREDERICK W. ROBERTSHAW, ET AL.

It is hereby certified that error appears in the printed specification of the above numbered patent requiring correction as follows: Page 3, line 124, claim 1, for "point" read "joint"; page 5, line 35, claim 11, for "opening" read "openings"; and that the said Letters Patent should be read with these corrections therein that the same may conform to the record of the case in the Patent Office.

Signed and sealed this 18th day of July, A. D. 1933.

M. J. Moore.

(Seal)  Acting Commissioner of Patents.